March 3, 1953 W. H. SILVER ET AL 2,630,232
LOAD MOVING ATTACHMENT FOR TRACTORS
Filed Dec. 23, 1946 4 Sheets-Sheet 1

INVENTORS
WALTER H. SILVER
WILLIAM V. LOHRMAN
BY
ATTORNEYS

March 3, 1953 W. H. SILVER ET AL 2,630,232
LOAD MOVING ATTACHMENT FOR TRACTORS
Filed Dec. 23, 1946 4 Sheets-Sheet 3

INVENTORS
WALTER H. SILVER
WILLIAM V. LOHRMAN
BY
ATTORNEYS

March 3, 1953  W. H. SILVER ET AL  2,630,232
LOAD MOVING ATTACHMENT FOR TRACTORS
Filed Dec. 23, 1946  4 Sheets-Sheet 4
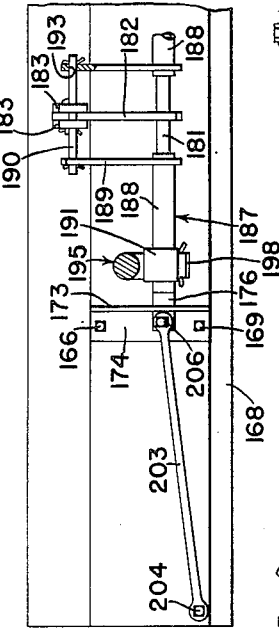
FIG. 6
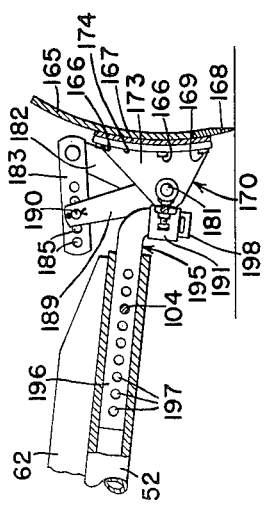
FIG. 7
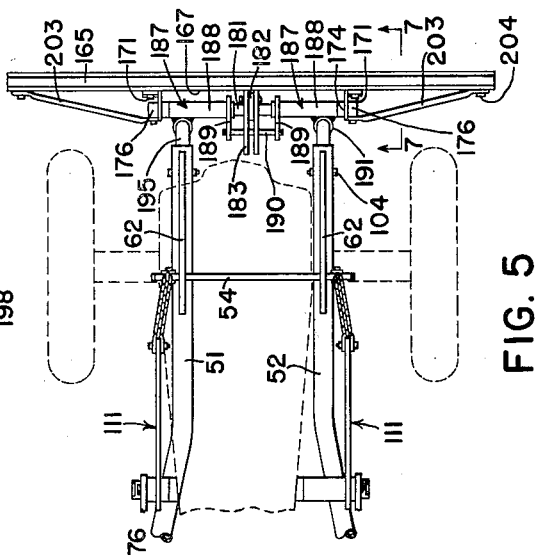
FIG. 5
FIG. 8
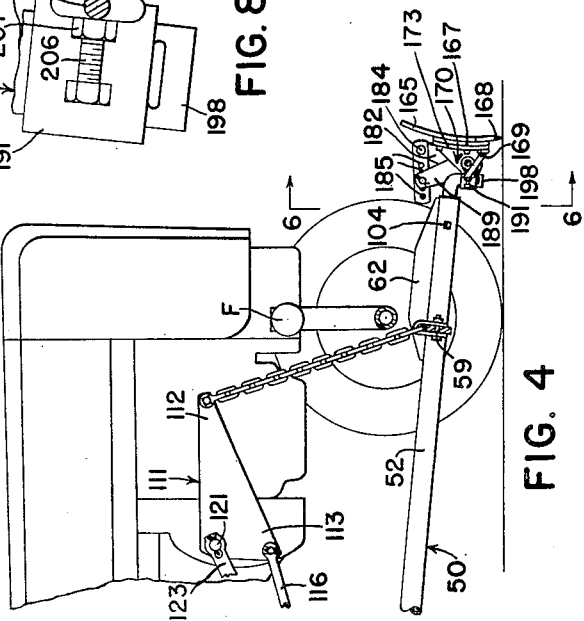
FIG. 4
INVENTORS
WALTER H. SILVER
WILLIAM V. LOHRMAN
BY
ATTORNEYS Patented Mar. 3, 1953

2,630,232

UNITED STATES PATENT OFFICE 2,630,232

LOAD MOVING ATTACHMENT FOR TRACTORS

Walter H. Silver, Moline, Ill., and William V. Lohrman, Davenport, Iowa, assignors to Deere & Company, Moline, Ill., a corporation of Illinois Application December 23, 1946, Serial No. 718,086

4 Claims. (Cl. 214—140)

The present invention relates generally to earth-working implements and more particularly to tractor mounted implements, such as mobile power operated scoops, scrapers, bulldozers and the like.

The object and general nature of the present invention is the provision of a tractor mounted load moving machine adapted to be mounted on a farm tractor and controlled by the power lift unit of the tractor. Another feature of this invention is the provision of a tractor mounted earth moving device so constructed and arranged as to be automatically dumped when the load engaging section of the machine is raised to a given height. Additionally, it is a further feature of this invention to provide means whereby the load engaging means, which may be a scoop or other load carrying unit, may be raised an adequate amount without having the frame of the load carrier interfere with the proper raising of the unit.

Another important feature of the present invention is the provision of a tractor mounted load moving machine arranged to be equipped optionally with either a scoop for carrying loads or a transverse blade for pushing loads, with new and improved means for attaching and carrying the load engaging means of either type. Still further, another feature of this invention is the provision of new and improved means for changing the angular position of the scraper blade.

An additional feature of the present invention is the provision of new and improved lifting means whereby when it is desired to raise the load engaging means, which is at the front of the implement frame, the front end of the frame is raised but the rear end is lowered thereby providing for a higher lift of the load engaging means than would otherwise be possible. Another feature of this invention is the provision of a load engaging means adapted to be mounted on a tractor having a vertically swingable drawbar operated by the power lift unit of the tractor, in connection with means whereby the drawbar receives the major portion of the thrust and, at the same time, forms a part of the raising and lowering mechanism.

These and other objects and advantages of the present invention will be apparent to those skilled in the art after a consideration of the following detailed description, taken in conjunction with the accompanying drawings, in which:

Figure 4 is a fragmentary side view showing a scraper carried by the implement frame in place of the scoop shown in Figures 1–3.

Figure 5 is a plan view of the implement shown in Figure 4.

Figure 6 is a fragmentary enlarged view taken generally along the line 6—6 of Figure 4.

Figure 7 is an end view of the scraper blade taken generally along the line 7—7 of Figure 5, showing its mounting on the implement frame.

Figure 8 is an enlarged view showing the inner connection of the scraper blade brace.

Figure 1:
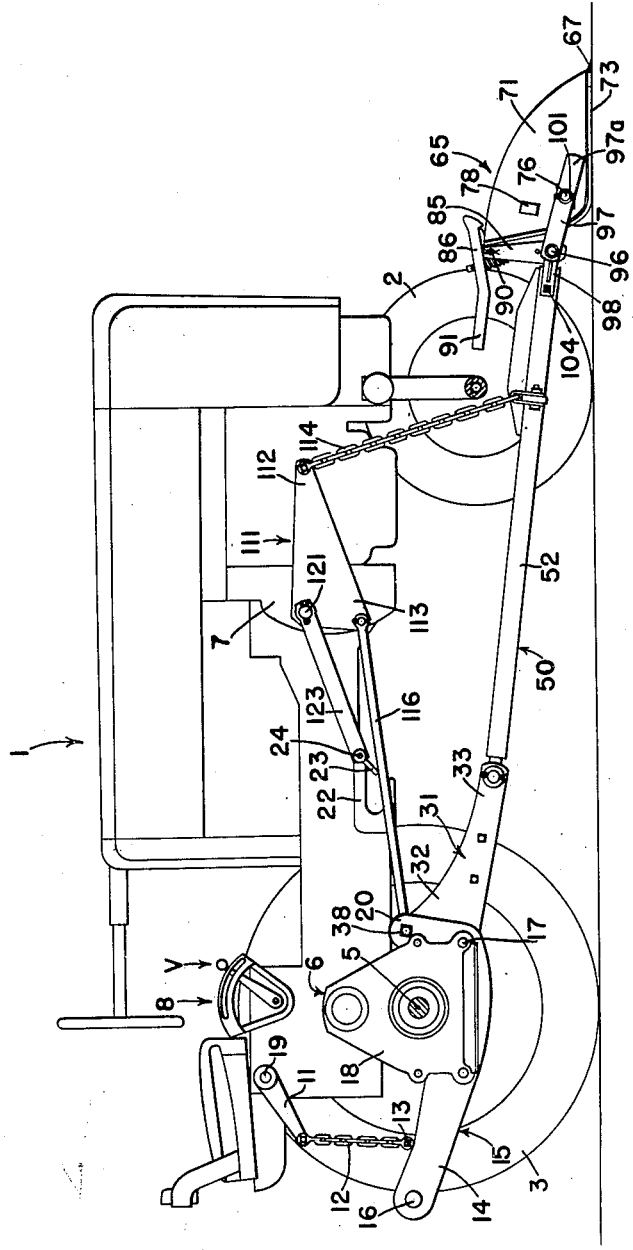
Figure 1 is a side view of a tractor mounted scoop or land leveler in which the principles of the present invention have been incorporated.
Figure 2:
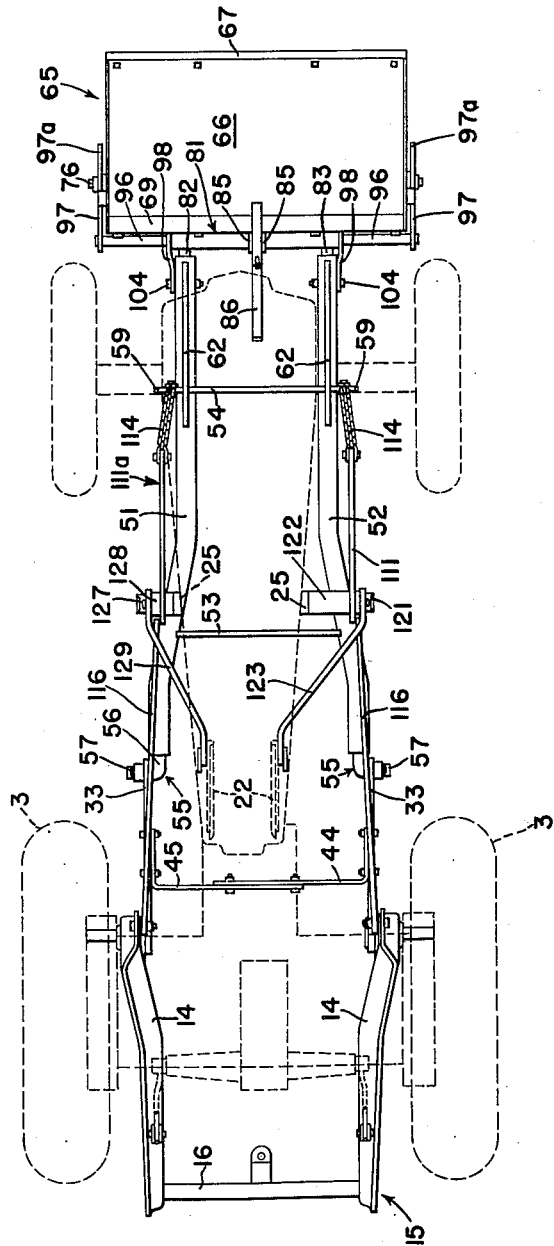
Figure 2 is a plan view of the machine shown in Figure 1, the tractor being shown in dotted lines in order to show the implement parts more clearly.
Figure 3:
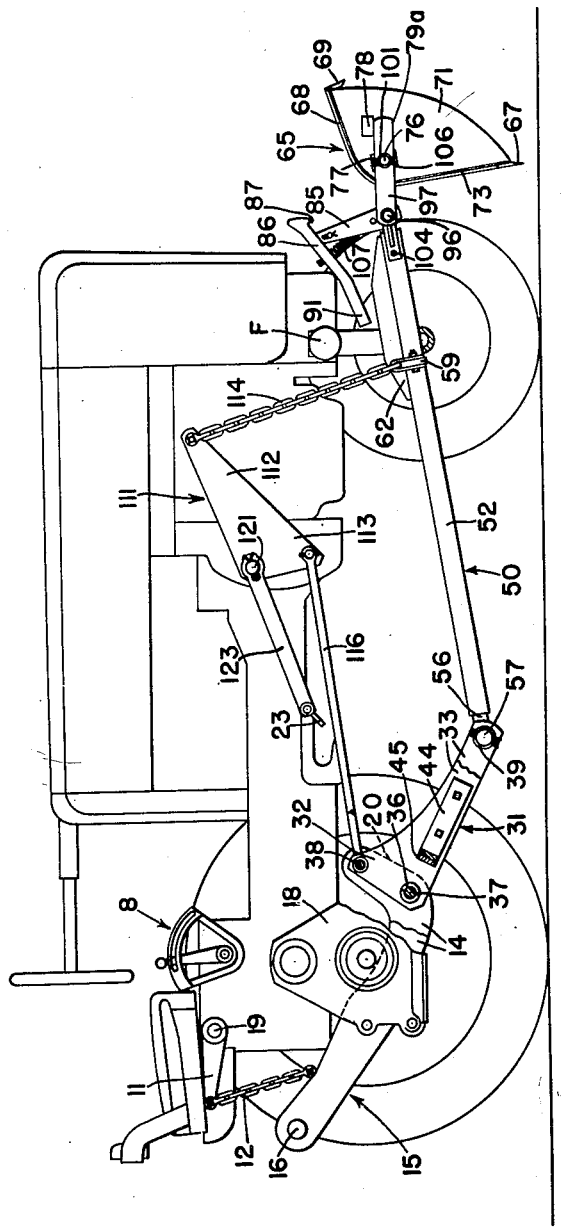
Figure 3 is a side view similar to Figure 1, showing the position of the implement when the latter is raised into its dumping position.

Referring now to the drawings, particularly Figures 1 and 2, the reference numeral 1 indicates a farm tractor of the four wheel type, having front wheels 2 and rear wheels 3 journaled for rotation on axle shafts 5 carried by a rear axle 6. The tractor includes a power plant 7 and a power lift unit 8 of the hydraulic type, including suitable valve mechanism V and other necessary parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear section 16, the side members being pivoted, as at 17, to drop housings which form a part of the rear axle structure. The two power lift arms 11 are clamped or otherwise fixed in any suitable manner to the ends of a power lift rockshaft 19 which forms a part of the hydraulic unit 8, and the forward end of each of the drawbar members 14 is provided with a generally vertically extending arm 20, the arms 20 being movable generally in a fore and aft direction while the rear portion of the drawbar 15 is swung generally vertically by power derived from the tractor power lift unit 8. This unit is of the type that may be moved into different positions and hydraulically locked in that position against downward movement under the control of the valve mechanism V.

The tractor 1 is of the type especially adapted for receiving a number of different quick detachable implements, and to this end the frame of the tractor carries an attaching plate 22 at each side, each plate 22 carrying a clamping nut member 23 threaded onto a stud 24. Also, the body of the tractor is provided with a pair of attaching sections 25, preferably formed on the clutch housing of the tractor motor M, each of said attaching sections including a tapped opening in which studs or the like may readily be mounted.

The earth working implement with which the present invention is more particularly concerned comprises a pair of drawbar extensions 31, each being in the form of a bell crank having a vertical section 32 and a generally forwardly extending section 33. The bell crank 31 is apertured, as at 36, to engage over and be pivotally mounted on the cylindrical bearing bushing 37 by which the associated tractor drawbar side member 14 is pivotally mounted on the pivot bolt 17 that is carried by the drop housing 18 at that side of the tractor. The upper end of the bell crank section 32 is provided with a pivot pin 38 which extends not only through an opening in the section 32 but also an opening in the upper end of the arm 20 that forms a part of the associated drawbar side member 14. By virtue of connections just described, the two drawbar extensions 31 are rigidly connected to the tractor drawbar or bail member 15 and move therewith when the tractor drawbar is swung upwardly or downwardly by operation of the tractor power lift unit 8. A cylindrical bearing member 39 is secured, as by welding, to the outer end of the bell crank arm 33, and the two drawbar extensions 31 are rigidly connected together by a pair of L-shaped braces 44 and 45 firmly secured together, as by bolts 46.

The frame 50 of the tractor mounted implement 10 comprises a pair of laterally spaced generally longitudinally extending tubular frame bars 51 and 52, suitably connected together by rigid cross braces 53 and 54, preferably welded to the tubular frame bars 51 and 52. The rear end of each of the tubular frame bars 51 and 52 is provided with a pivot member 55 having one leg 56 received in the rear end of the associated frame bar and the other leg 57 is disposed in the bearing member 39 on the associated drawbar extension crank 31. A cotter or the like holds the ends 57 in the bearing member 39. The forward cross brace 54 has each end extended laterally outwardly beyond the associated frame bar and apertured, as at 59, to receive lifting means described below. The forward end of each of the tubular frame members 51 and 52 is reenforced by a brace bar 62 welded to the upper side of each frame bar, and each brace bar 62 may be notched to extend over adjacent portions of the forward cross brace member 54.

An earth engaging unit in the form of a scoop 65 is carried at the front end of the frame 50. The scoop 65 comprises a bottom sheet 66 having a sharpened cutting blade 67 secured to the forward edge thereof, the sheet 66 extending upwardly and rearwardly and forming a rear portion 68 the upper edge of which is reenforced by a cross angle 69. End plates 71 of the proper shape are secured, as by welding, to the ends of the sheet sections 66 and 68, and the latter are reenforced by scoop runners 73 also secured, as by welding, to the sheet sections 66 and 68. A scoop pivot 75 is secured to each end of the scoop 65, and each scoop pivot comprises a stud 76 and a plate 77 to which the stud 76 is welded or otherwise secured, and which in turn is secured as by welding to the associated scoop end 71. Each scoop end also carries a stop or abutment 78 to which reference will be made below.

The scoop 65 is pivotally mounted on the front end of the frame 50, and to this end a transverse tubular member 81 is provided at its ends with a pair of studs 82 and 83 which are adapted to seat in the open forward ends of the tubular frame bars 51 and 52. A bolt 104 extends through openings in the frame bars and the studs for rigidly holding the pivoted member 81 to the frame bars 51 and 52. Centrally, but in laterally spaced apart relation, the tubular member 81 carries a pair of upwardly extending locking arms 85, the upper ends of which are apertured to receive a locking detent member 86 that is pivoted, as at 90, at the ends of the arms 85. The detent member 86 is provided with a forward nose portion 87 that is adapted to engage over the edge of the scoop angle 69, when the latter is in earth engaging position, as will be explained below, and the rear portion of the detent 86 is extended, as at 91, to form a tractor engaging portion to which reference will be made below.

Each end of the tubular bearing member 81 receives the inner section of a pivot shaft 96, the outer end of each of the shafts 96 being provided with a scoop-receiving arm 97, securely welded or otherwise fixed to the outer end of the associated shaft 96. Laterally inwardly of the arm 97, each of the pivot shafts 96 carries an inner attaching arm 98 which is welded to the shaft 96. The outer arm 97 of each of the shafts 96 is provided with a cylindrical bearing member 101 that is adapted to receive the scoop stud 76 at that side of the tractor, and each arm 97 is extended beyond the bearing member 101, as indicated at 97a. As best shown in Figure 2, when the shafts 96 and associated structure are mounted in position in the tubular bearing member 81 that is carried at the front end of the frame 50, the arms 97 embrace the sides of the scoop 65. The outer ends of the arms 98 are apertured to receive a pivot bolt 104 or other suitable means by which each arm 98 may be securely fixed to the forward end of the associated frame bar, and when the bolts 104 are tightened, the two shafts 96 are held in position in the bearing member 81, and at the same time, each bearing section 101 on the side arms 97 is held in engagement with the associated stud 76 on the scoop, thereby providing for pivotal movement of the scoop relative to the front end of the frame 10. The shafts 96 and associated parts are further held in position by cotters 106 which are disposed in apertures in the outer ends of the scoop studs 76. The pivotal movement of the scoop 65 relative to the frame is limited in the downward direction by the stops or abutments 78, into contact with the extended ends 97a of the arms 97, and the latch member 86 is normally held in latched engagement with the upper flange of the angle 69 of the scoop by means of a spring 107 or the like, one end of which is connected with the latch 86 and the other end of which is connected with a pin or other fastening carried by the arms 85.

The front end of the frame 10, and the load carrying scoop mounted thereon, are raised and lowered by means adapted to be mounted on the tractor and which preferably comprises a pair of lifting arms 111 in the form of bell cranks, each including a forwardly extending section 112 and a downwardly extending section 113, each being apertured. A chain 114 is connected at its upper end to a bolt or pin to the forward end of the horizontal bell crank section 112, the lower end of the chain 114 being connected with a certain amount of looseness or slack to the forward portion of the associated frame bar 51 or 52, and the other bell crank section 113 of each of the lifting arms 111 is connected by a link 115 to the associated tractor drawbar extension arm 32 and the drawbar arm 20.

Each of the lifting arms 111 is mounted on a pivot structure which comprises a stud member 121 rockably receiving a sleeve 122 to which the arm 111 is rigidly connected, as by welding or the like. A brace member 123 is apertured at its forward end to receive the outer end of the stud 121, the brace member 123 being shaped as shown in Figure 1 and at its rear end apertured to pass over the stud 24 at that point whereby tightening the screw or clamping member 23 serves to rigidly fasten the brace 123 in position. Similarly, the stud 127 is carried at the left side of the tractor on the attaching section 25 and receives a sleeve 128 that forms a part of the left hand lifting bell crank 111a. A brace 129 serves to connect the outer end of the stud 127 with the attaching stud 24 on the left side of the tractor.

The operation of the implement so far described is substantially as follows. When it is desired to move a quantity of soil or other load, as for leveling off portions of the land or for other uses, the tractor power lift unit 8 is operated so as to lower the drawbar 15. This acts through the extension arms 31 to raise the rear end of the frame 50 and, at the same time, lower the lift arm sections 112, thus permitting the scoop 65 to engage the ground, the scoop 65 normally being held against pivoting relative to the frame 10 by virtue of the latch 86. The parts are so arranged that in this position there is a certain amount of slack in the chain 114, and when the tractor 1 is driven forwardly the scoop 65 enters the ground and removes portions of the soil therefrom. Normally the chain 114 is slack, but when the load is completed, the tractor power lift unit valve V is operated to raise the tractor drawbar 15. This swings the drawbar arms 29 forwardly, and at the same time the forward ends of the drawbar extensions 33 swing downwardly, thus lowering the rear portion of the implement frame 50 while raising the upper portion. It will be noted that the front end of the frame 10 passes underneath and forward of the front axle F of the tractor 1 and that the scoop or load receiving means 65 is disposed forwardly thereof. Where the frame passes underneath the front axle of the tractor, the vertical movement of the frame is somewhat limited, and therefore, according to the principles of the present invention, in order to secure adequate lift for the scoop for dumping and transporting purposes, and also to distribute the load of raising the filled scoop, the connections described above act to lower the rear end of the frame 10 downwardly while raising the front end thereof upwardly. This gives the desired angular change in the position of the scoop, between ground engaging and transport positions, without requiring that the frame be lifted to excessive heights. The load may be carried by raising the scoop upwardly to a point just about where the rear portion 91 of the latch 86 is adjacent but yet out of contact with an adjacent portion of the tractor. Then by operating the tractor power lift to raise the front end of the frame 10 an additional amount, the latch section 91 engages the adjacent portion of the tractor and the latch is tripped, thus permitting the scoop 65 to pivot forwardly, the pivot studs 76 being arranged well to the rear so that when loaded the scoop tends to tip forwardly. The latch 86 is restored to locking position by dropping the front end to the ground, which swings the scoop 65 on the pivots 76 into position permitting the nose 87 of the latch 86 to engage over the edge of the angle 61.

For bulldozing operations and similar work, it may be desirable to substitute a transverse or angled blade for the scoop 65. To this end, we provide a scraper blade and attaching connections to take the place of the scoop 65 and its attaching connections and the scraper blade and associated parts will now be described.

A transverse scraper blade 165 is mounted, as by bolts 166, on a transverse scraper blade support 167, and the lower edge of this scraper blade is provided with a sharpened scraper bar 168 secured to the blade proper by bolts 169 or the like. A pair of bearing members 170 are fixed, as by the bolts 166 and 169, to the scraper blade 165, with each bearing member including a vertical apertured plate 173 having a forward curved edge welded to a curved attaching plate 174 which is apertured to receive the bolts 166 and 169. A bearing bushing 176 is disposed in the aperture in each of the plates 173 and is welded thereto. Each bearing bushing 176 constitutes a cylindrical member which is apertured at one side and in line with said aperture is a nut member 177 securely welded to the member 176. A transverse supporting shaft 181 has its end portions disposed in the bearing members 176, and centrally the shaft 181 has an arm 182 welded at its lower end thereto and apertured at its upper end to receive a pair of blade adjusting straps 183, one end of each of which is pivoted at 184 to the upper end of the arm 182. The pair of straps 183 are provided with a number of openings 185. A pair of shaft bearing assemblies 187 are disposed on the shaft 181, one being a right hand unit and the other being a left hand unit, disposed on opposite sides of the arm 182. Each shaft bearing assembly 187 includes a sleeve section 188, an arm 189 secured, as by welding, to the inner end of the associated sleeve 188, and a vertical pivot sleeve 191 that is welded to the other end of the horizontal sleeve 188. The outer ends of the arms 189 are apertured, as at 193, and loosely receive a transverse pin 190 which extends through a selected one or any of the openings 185 in the adjusting straps 183. It will be noted that the two sleeves 188 are mounted on the shaft 181 with a certain amount of lost motion between the ends of the shaft 181 and the central arm 182. A pair of connectors 195 are provided for mounting the two shaft bearing assemblies 187 on the front ends of the frame 10. To this end, each of the connectors 195 comprises a rod or shaft member having its longer leg 196 provided with a number of apertures 197 and its other leg 198 extended at substantially right angles to the main body of the member 196. The longer end 196 of each of these connectors is adapted to be inserted in the open forward end of the associated frame bar 51 or 52, and the other or angled end portion 198 is adapted to be disposed in a vertical position and inserted through the associated vertical bearing sleeve section 191. Cotters or the like are provided for holding the parts in assembled relation, and by disposing the bolts 194 in the proper openings 197, the connectors 195 may be arranged to hold the blade in exactly a transverse position or in an angled position, as desired. The provision for limited sliding movement of the sleeves 188 on the supporting shaft 181 accommodates the necessary adjustment in a lateral direction of the bearing members 191 when the connectors 195 are arranged to dispose the blade in a diagonal position. The blade is raised and lowered by operation of the power lift unit in substantially the same way as described above in connection with the scoop 65.

The shaft 181 is provided with set screw receiving sockets 201 to receive set screws 206 threaded into the nuts 177 and the openings in the sleeve sections 176, whereby the shaft 181 is rigidly secured to the blade. Also, the outer ends of the blade are reenforced by diagonal brace rods 203, the outer ends of which are bolted, as at 204, to the blade, and the inner end of each of which is arranged to receive the set screw 206, which carries an extra nut 207 which, when tightened against the rod 203, holds the latter firmly to the bearing member 170 associated therewith.

The operation of the scraper shown in Figures 4–7, so far as raising and lowering is concerned, is substantially as described above. The scraper may be disposed in a transverse position, or by taking out one of the bolts 104 and sliding the associated member 195 forwardly in the front end of the tubular frame receiving it, the scraper may be disposed in an angled position. The tilt of the scraper may be adjusted by removing the pin 190 and inserting it in one of the other holes in the links 182 and 183.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. For use in a load moving machine including a mobile support, the improvement comprising a generally longitudinally extending frame means, load receiving means at the front end of said frame means, a first movable supporting means adapted to be movably carried on the generally forward portion of said mobile support, a second supporting means adapted to be movably mounted on said support generally rearwardly of said first supporting means, motion-reversing means interconnecting said first and second supporting means so that when one portion of one of said supporting means moves generally upwardly one portion of the other supporting means moves generally downwardly, means connecting the generally forward portion of said frame means with said one portion of said one supporting means, means connecting the generally rear portion of said longitudinal frame means with said one portion of said other supporting means, and means connected with said first and second supporting means for operating them so as to raise and lower said frame means and the load receiving means carried thereby.

2. A tractor mounted load moving machine adapted to be mounted on a tractor having a rear drawbar swingable generally about a transverse axis, said machine comprising frame means, arm means adapted to be connected rigidly with said tractor drawbar and to swing therewith about said transverse axis, means for connecting the rear end of said frame means with said arm means, whereby movement of the latter about said transverse axis serves to raise and lower the rear end of said frame means, load receiving means carried at the front end of said frame means, raising and lowering means adapted to be mounted on the tractor and operatively connected with the generally forward portion of said frame means, and a motion-transmitting connection adapted to extend between said tractor drawbar at a point spaced from the forward portion of said arm means, and said raising and lowering means, whereby movement of said tractor drawbar acts through said arm means and said raising and lowering means for raising and lowering said load receiving means relative to the tractor.

3. A tractor mounted load moving machine adapted to be mounted on a tractor having a rear swingably mounted drawbar and a power unit for swinging said drawbar, said load moving machine comprising load moving means, a lever adapted to be mounted on the tractor forward of the tractor drawbar and including a portion swingable upwardly when the rear portion of said tractor drawbar is swung upwardly, means connecting said load moving means at a point spaced rearwardly of the front end thereof with said upwardly shiftable portion of said lever, a part adapted to be connected with the tractor drawbar whereby when the rear portion of the latter is swung downwardly said part is swung upwardly, and means for connecting the rear portion of said load moving means with said part, whereby when the rear portion of said tractor is swung upwardly, the rear portion of said load moving means is moved downwardly while the forward portion of said load moving means is moved upwardly.

4. A load carrying machine adapted to be attached to a tractor having a rear generally vertically swingable drawbar movable about a generally transverse axis adjacent the rear of the tractor, said machine comprising frame means comprising a pair of generally longitudinally extending laterally spaced frame bars adapted to be disposed along the underside of the tractor, means including a pair of attachment arms, means for connecting the rear ends of said arms with the forward portion of the tractor drawbar, whereby movement of the latter about said transverse axis serves to raise and lower the forward portions of said attachment arms, means for connecting the rear ends of said frame bars with the forward ends of said attachment arms, load carrying means connected with the front ends of said frame bars, means adapted to be mounted on the tractor and operatively connected with the tractor drawbar and the front ends of said frame bars for raising and lowering the latter, and means for operatively connecting said bar raising and lowering means with said tractor drawbar.

WALTER H. SILVER.
WILLIAM V. LOHRMAN.

REFERENCES CITED

The following references are of record in the file of this patent:

UNITED STATES PATENTS

| Number | Name | Date |
|---|---|---|
| 1,703,275 | Lessmann | Feb. 26, 1929 |
| 1,703,600 | Sell | Feb. 26, 1929 |
| 1,958,269 | Green | May 8, 1934 |
| 1,973,950 | Frank | Sept. 18, 1934 |
| 2,019,854 | Hester | Nov. 5, 1935 |
| 2,238,346 | Sorensen | Apr. 15, 1941 |
| 2,295,898 | Hollis | Sept. 15, 1942 |
| 2,300,843 | Norwood | Nov. 3, 1942 |
| 2,307,655 | Arps | Jan. 5, 1943 |
| 2,313,534 | Gledhill | Mar. 9, 1943 |
| 2,314,475 | Bird et al. | Mar. 23, 1943 |
| 2,356,600 | Lentz | Aug. 22, 1944 |
| 2,361,122 | Raney et al. | Oct. 24, 1944 |
| 2,401,159 | Hunter | May 28, 1946 |
| 2,405,334 | Silver | Aug. 6, 1946 |